United States Patent [19]

Dossin et al.

[11] Patent Number: 5,040,334
[45] Date of Patent: Aug. 20, 1991

[54] OPENING ELEMENT OF THE BODY OF AN AUTOMOTIVE VEHICLE

[75] Inventors: Jacques Dossin, Courbevoie, France; Hubert Goldbach, Ratingen, Fed. Rep. of Germany; Boris Koch, Wermelskirchen, Fed. Rep. of Germany

[73] Assignees: Automobiles Peugeot; Automobiles Citroen, both of France

[21] Appl. No.: 601,815

[22] PCT Filed: Feb. 28, 1990

[86] PCT No.: PCT/FR90/00140
§ 371 Date: Nov. 2, 1990
§ 102(e) Date: Nov. 2, 1990

[87] PCT Pub. No.: WO90/09902
PCT Pub. Date: Sep. 7, 1990

[30] Foreign Application Priority Data

Mar. 3, 1989 [FR] France ................ 89 02752

[51] Int. Cl.$^5$ .............................. B60J 5/04
[52] U.S. Cl. ........................ 49/502; 49/503; 296/146
[58] Field of Search .............. 49/502, 503, 501; 296/904, 905, 146

[56] References Cited

U.S. PATENT DOCUMENTS

| | | | |
|---|---|---|---|
| 3,782,036 | 1/1974 | Clark et al. | 49/502 |
| 3,791,693 | 2/1974 | Hellriegel et al. | 49/503 X |
| 4,769,951 | 9/1988 | Kaaden | 49/502 |
| 4,949,508 | 8/1990 | Elton | 49/503 X |
| 4,974,365 | 12/1990 | Ono | 49/502 |
| 4,984,389 | 1/1991 | Benoit et al. | 49/502 |

FOREIGN PATENT DOCUMENTS 204996 12/1986 European Pat. Off. .
2416809 9/1979 France .

*Primary Examiner*—Philip C. Kannan
*Attorney, Agent, or Firm*—Wong & Husar

[57] ABSTRACT

The invention relates to an opening element of the body of an automotive vehicle comprising particularly a panel constituted by a metal part, and a plastic part having stiffening ribs and molded onto the metal part.

According to the invention, the metal part (1) and the plastic material composite part (2) constitue an internal structural component (16) of a panel, the outside panel (24) being attached to this internal structural component (16), and in that the metal part (1) has an annular form of U shaped section toward the interior in which are molded the ribs (6) of the plastic part (2), these ribs being inside by the mounting points provided on the metal part (1).

19 Claims, 2 Drawing Sheets

OPENING ELEMENT OF THE BODY OF AN AUTOMOTIVE VEHICLE

The invention has as an object the realization of a composite opening element, such as a door or rear hatch or trunk lid of an automotive vehicle body, constituted by an association of metal and plastic material parts.

One knows of opening elements comprised of a panel constituted by a metal part such as a central sheet metal plate on which is molded a peripheral part of synthetic material, while there can be provided, coming directly from the operation of molding of the peripheral piece on the metal plate, stiffening ribs, elements of articulation of the opening element, or the points of attachment for example for the locks and the balancers. One such arrangement has the disadvantage that it does not provide the interior appearance and finish of the opening element.

The invention consists of an embodiment of an opening element of an automotive vehicle body having a one piece metal part of annular form and a one piece molded on plastic part forming the internal structural component of the opening element, the part of plastic providing the interior appearance and finish of the opening element.

Such an arrangement has the advantage of obtaining a homogeneous structural assembly and a perfect seal.

The invention relates thus to an opening element of an automotive vehicle body comprising particularly a panel constituted by a metal part, and a plastic part having stiffening ribs and molded onto the metal part, characterized in that the metal part and the plastic part constitute an internal structural component of the panel, an outside panel being attached to this internal structural component, and in that the metal part has an annular form of U section toward the interior in which are molded the stiffening ribs, these ribs being retained by the mounting points provided on the metal part.

According to another characteristic of the invention, the plastic part comprises a panel adapted to close the interior space of the metal part.

According to one preferred embodiment of the invention, the metal part has the form of a right angle trapezoid with an internal leg connecting the right angle adjacent the longer base to the opposite side.

According to another characteristic, an interior lining of thermoplastic material adapted to cover the shapes of the metal part is welded or bonded to the plastic part.

Other characteristics and advantages of the invention will be more apparent from the detailed description which follows and with reference to the accompanying drawings which give only an example, and in which.

Figure 1:
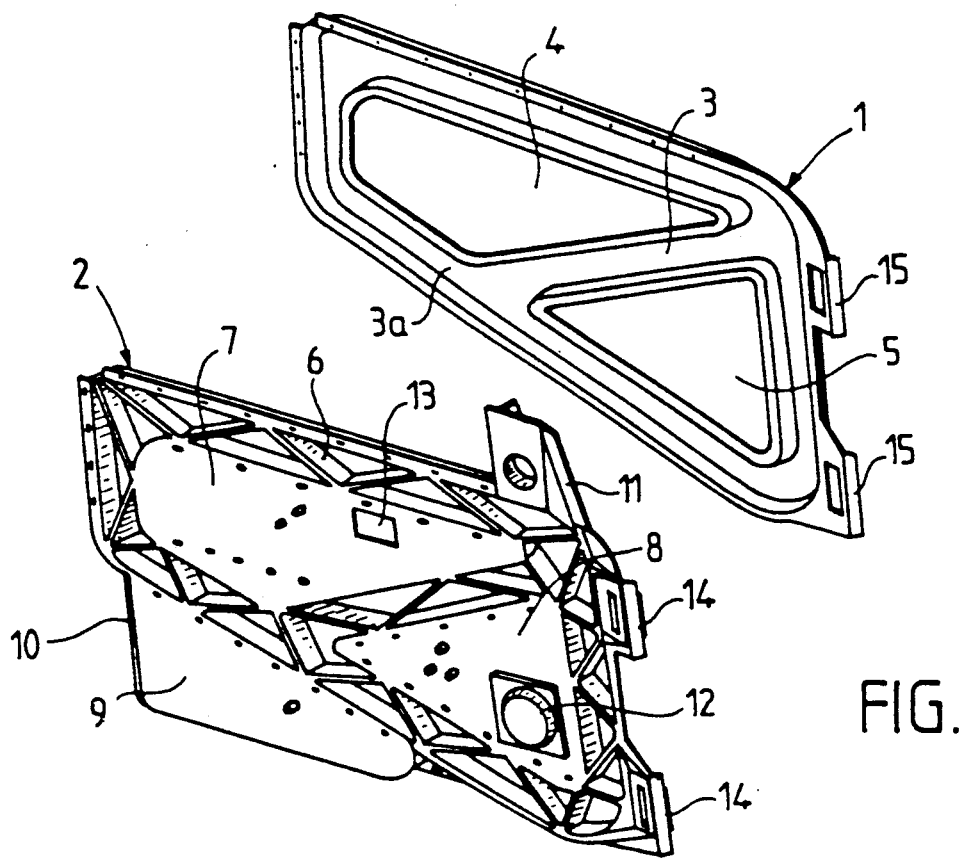
FIG. 1 is an exploded view of the internal structural component of the lower panel of an opening element of an automotive vehicle body, such as a door.

FIG. 1 shows exploded, the internal structure of an opening element such as a door constituted of an annular metal part 1 and a plastic material composite part 2, for example, of thermoplastic material reinforced with glass fibers. The metal part 1 of U section has essentially the shape of a right angle trapezoid with an internal leg 3 connecting the right angle of the longer base with the opposite side 3a, thus defining two openings 4 and 5. Such a shape allows taking into account the lines of force between the attachments of the door to the chassis (hinges and latch) namely: longitudinal compression, lateral intrusion, rigidity in torsion for the glass frame, and vertical rigidity. On the metal part is molded the plastic material composite 2 which has on one hand the stiffening ribs 6 retained in the interior of the metal part by points of mounting, and on the other hand the panels 7 and 8 adapted to close the openings 4 and 5 of the metal part. This provides in addition, a panel 9 disposed under the oblique side 3a of the metal part, and comprising an edge or rim 10 to form the bottom of a glove compartment or storage pocket.

During molding, there can be provided elements to incorporate certain functions, such as:
a rear-view mirror support structure 11:
a boss 12, provided on the face toward the outside of the door for supporting the window lifter;
an opening 13 permitting passage of the lock mechanism;
two lugs or flanges 14 for cooperation with two lugs 15 provided on a side of the long base of the metal part 1 and adapted to receive the hinge elements of the door.

There can also be provision to incorporate other functions not shown such as high fidelity speakers, the attachment points for window tracks, or the window frame.

The assembly of the plastic part 2 so molded onto the metal part 1 forms the internal structural component 16 of the lower panel of the door.

Figure 2:
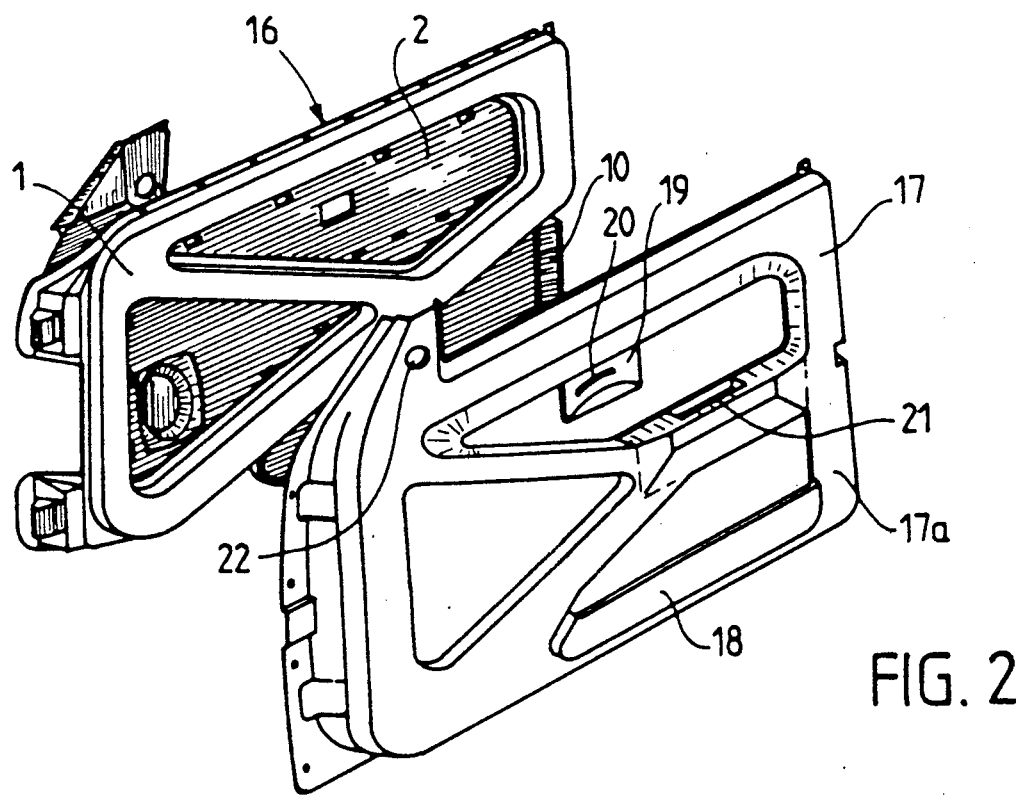
FIG. 2 is an exploded view showing the mounting of the interior lining of the door on the internal structural component.

On FIG. 2 one sees facing toward the internal structural component 16, an interior lining (or trim) 17, made of a thermoplastic material. This has a form complimentary to that of the metal part 1 to only cover the latter.

In this manner one can obtain a decorative effect which contrasts with the plastic part 2 by using materials with different surface appearance and different pigmentation.

There can be provided integrated with the interior lining 17, moldings with the following functions:
glove compartment (or storage pocket) by the deformation 18 in the panel 17a cooperating with the bottom 9-10 of the plastic part 2;
a cover 19 having a slot 20 for the passage of the lock control mechanism and adapted to conceal the opening 13 of the plastic part 2;
a handle opening 21;
a rear view mirror support cover 22;

The interior lining 17 is welded (or bonded) onto the plastic part 2. The compatibility of welding of the two thermoplastic parts 2 and 17 permits obtaining a sealed homogeneous (or unitary) assembly.

This design also allows a series effect: the decorative coverings (fabrics, ...) can be inserted in the medallions 7 and 8 in an economical manner because it is not necessary then to provide a finish on the periphery of these coverings.

Figure 3:
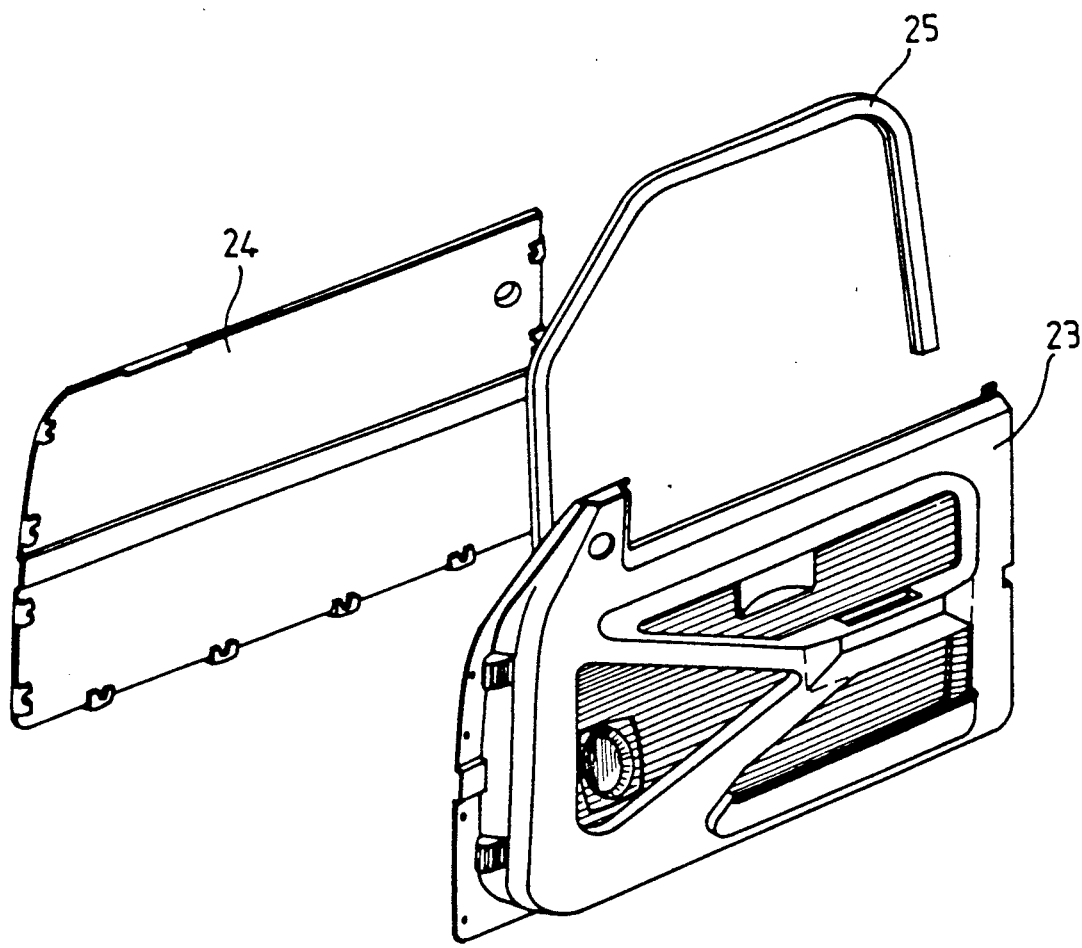
FIG. 3 is an exploded view showing the mounting of the outer panel of the door and the glass channel on the assembled internal interior-lining structure.

At FIG. 3 one can see the final steps of finishing the door, with the interior panel° assembly 23 obtained from FIG. 2, and on which is secured the outside panel 24 and the window frame 25.

The preceding description has been made in the environment of a door for an automotive vehicle, but the invention is not limited to the mode of the embodiment described, but covers to the contrary, all the variations, in particular all other opening elements of the body of an automotive vehicle, such as the rear hatch or trunk.

We claim:

1. Opening element of an automotive vehicle body comprising, a panel assembly having an internal structural assembly comprised of a metal part and a plastic part having stiffening ribs and molded onto the metal part, said metal part having an annular portion of U shape in section opening toward the plastic part and said stiffening ribs of the plastic part being molded into and anchored in the annular portion of U shaped section of the metal part, and an outer panel secured to the internal structural assembly.

2. Opening element according to claim 1 wherein said annular portion of the metal part surrounds an inner opening of the metal part, and said plastic part comprises a panel portion extending across and closing said inner opening.

3. Opening element according to claim 2 wherein the metal part has the shape of a trapezoid with a right angle corner at one end of a long base of the trapezoid, and an inside leg connecting the right angle corner to an opposite side of the trapezoid.

4. Opening element according to claim 3 wherein said metal part further comprises on a side of the long base, first and second flanges adapted to cooperate with first and second flanges of the plastic part to form hinge elements of the opening element.

5. Opening element according to claim 4 further comprising an interior lining of thermoplastic material bonded to said plastic part, said lining extending over and covering the metal part.

6. Opening element according to claim 5 wherein said plastic part further comprises, a rear view mirror support, interior bosses for equipment, points of attachment for a window frame and slides, and an opening for passage of a lock control mechanism.

7. Opening element according to claim 6 wherein said metal part of trapezoid shape includes an oblique leg, said interior lining includes a deformation in a panel below said oblique leg, and the plastic part comprises a panel located under the oblique leg and having a rim cooperating with the panel and deformation of the interior lining to define a storage compartment.

8. Opening element according to claim 7 wherein said interior lining comprises a molded lining and further comprises, a handle, and a cover having a slot for covering a lock mechanism opening in the plastic part.

9. Opening element according to claim 1 further comprising an interior lining of thermoplastic material bonded to said plastic part, said lining extending over and covering the metal part.

10. Opening element according to claim 9 wherein said interior lining comprises a molded lining and further comprises, a handle, and a cover having a slot for covering a lock mechanism opening in the plastic part.

11. Opening element according to claim 1 wherein the metal part has the shape of a trapezoid with a right angle corner at one end of a long base of the trapezoid, and an inside leg connecting the right angle corner to an opposite side of the trapezoid.

12. Opening element according to claim 11 wherein said metal part further comprises on a side of the long base, first and second flanges adapted to cooperate with first and second flanges of the plastic part to form hinge elements of the opening element.

13. Opening element according to claim 12 further comprising an interior lining of thermoplastic material bonded to said plastic part, said lining extending over and covering the metal part.

14. Opening element according to claim 13 wherein said plastic part further comprises, a rear view mirror support, interior bosses for equipment, points of attachment for a window frame and slides, and an opening for passage of a lock control mechanism.

15. Opening element according to claim 14 wherein said metal part of trapezoid shape includes an oblique leg, said interior lining includes a deformation in a panel below said oblique leg, and the plastic part comprises a panel located under the oblique leg and having a rim cooperating with the panel and deformation of the interior lining to define a storage compartment.

16. Opening element according to claim 15 wherein said interior lining comprises a molded lining and further comprises, a handle, and a cover having a slot for covering a lock mechanism opening in the plastic part.

17. Opening element according to claim 11 wherein said plastic part further comprises, a rear view mirror support, interior bosses for equipment, points of attachment for a window frame and slides, and an opening for passage of a lock control mechanism.

18. Opening element according to claim 17 further comprising an interior lining of thermoplastic material bonded to said plastic part, said lining extending over and covering the metal part.

19. Opening element according to claim 18 wherein said interior lining comprises a molded lining and further comprises, a handle, and a cover having a slot for covering the lock mechanism opening in the plastic part.

* * * * *